United States Patent [19]

Burton

[11] 4,322,887
[45] Apr. 6, 1982

[54] METHOD AND APPARATUS FOR OPEN FLOW AREA CLASSIFICATION

[75] Inventor: Clark R. Burton, Los Altos, Calif.
[73] Assignee: Compair, Inc., Burlingame, Calif.
[21] Appl. No.: 171,747
[22] Filed: Jul. 24, 1980
[51] Int. Cl.³ .............................................. G01B 5/20
[52] U.S. Cl. .................................................. 33/174 C
[58] Field of Search ........... 33/174 L, 174 C, 174 PA

[56] References Cited

U.S. PATENT DOCUMENTS

| | | | |
|---|---|---|---|
| 3,464,119 | 9/1969 | Griggs | 33/174 C |
| 3,757,424 | 9/1973 | Palmenberg | 33/174 C |
| 3,959,886 | 6/1976 | Griggs | 33/174 C |
| 4,222,172 | 9/1980 | Mason | 33/174 C |

Primary Examiner—Richard R. Stearns
Attorney, Agent, or Firm—Robert Charles Hill

[57] ABSTRACT

A classification gauge and method of operation for accurately and repeatably measuring the open flow area of a pair of air foil or vane elements interconnected by end buttresses, the classification gauge including first and second sets of probes arranged for contact with the vanes adjacent the open flow area and first and second lateral probes for engaging the end buttresses, an indicator of open flow area being effectively interconnected with the two sets of probes and the two lateral probes by means of a proportional mechanism.

22 Claims, 6 Drawing Figures

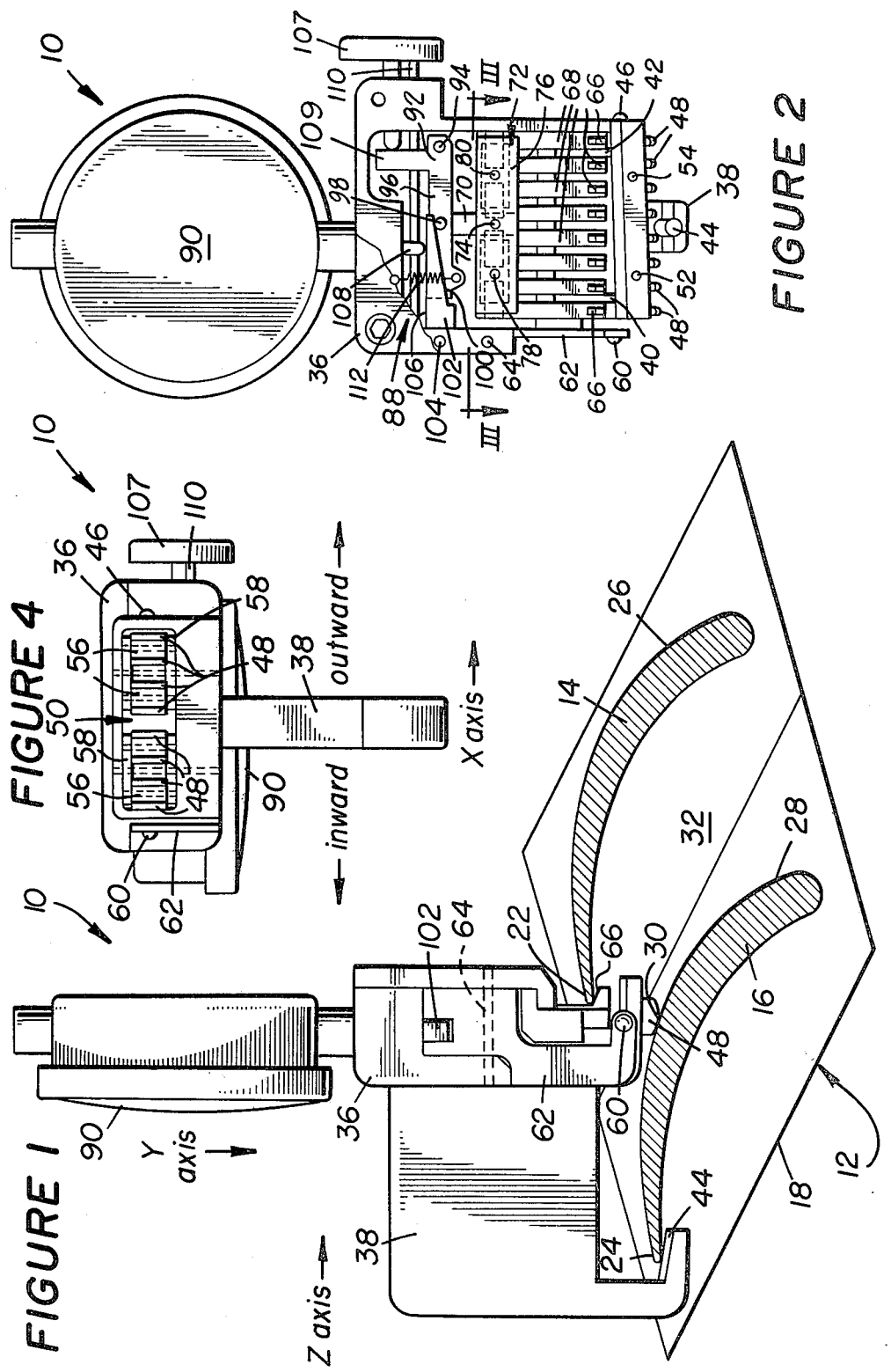

METHOD AND APPARATUS FOR OPEN FLOW AREA CLASSIFICATION

BACKGROUND OF THE INVENTION

The present invention relates to a method and apparatus for classifying air foil or vane elements such as turbine stator vanes and the like and more particularly to such a method and apparatus for accurately and repeatably measuring the open flow area formed by a pair of airfoils or vanes interconnected by end buttresses.

A number of classification gauges have been developed in the past in order to provide an accurate determination of the relative effective open area in the various stages of turbojet engines and the like. Such classification gauges have been particularly directed toward the classification or determination of such values in connection with individual vane elements or vane clusters including a plurality of guide vanes, turbine blades and/or other similar structures. For example, U.S. Pat. No. 3,464,119, issued Sept. 2, 1969 to Elmer L. Griggs, disclosed a precision classification guage for classifying individual guide vanes or the like for turbojet engines in order to facilitate assembly of various stages of the engine according to predetermined values for the effective open areas of the individual vanes. U.S. Pat. No. 3,959,886, issued June 1, 1976, also to Elmer L. Griggs, disclosed a similar classification gauge adapted for classifying or determining the relative effective open area for vane clusters rather than individual vane elements. U.S. Pat. No. 4,024,646, issued May 24, 1977, also to Elmer L. Griggs, disclosed yet another apparatus for simultaneously guaging and aligning movable elements of guide vane assemblies including a plurality of vanes or airfoil elements in order to both classify and adjust the effective open area for the vane assembly. Finally, co-pending U.S. Patent Application Ser. No. 133,949 filed Mar. 25, 1980 and entitled "Classification Instrument" disclosed yet another device including a plurality of indicators for providing classification readings corresponding to a number of different features for an airfoil or vane element. All of the above are assigned to the assignee of the present invention.

Substantial background information is set forth by the above noted references, particularly the first noted patent, and reference may be made to those patents for a more complete understanding of certain aspects of the present invention. Generally, it has been found important to obtain precise classification or determination of the effective open area for airfoils or vanes in a cluster or vane assembly. This value is also commonly referred to as "throat area" and must be precisely established in various stages in machinery such as turbojet engines for their proper and most efficient performance.

The classification gauges described in the above noted references have been found to be particularly suitable for determining proper classification of individual guide vanes, vane clusters and even complete arrays of vanes or similar structures. Generally, the above noted classification gauges function to accurately position within a precision jig one portion of an airfoil, such as its trailing edge, other portions of the airfoil then being precisely measured or monitored in order to classify the effective open area for the individual vanes or vane assemblies. Very generally, the open area for such vanes or vane assemblies may be determined by accurately monitoring the location of the trailing edge for one vane, the convex airfoil surface of an adjacent vane, and the spacing between inside surfaces of end buttresses employed to mount the vanes in the assembly.

However, none of the classification guages disclosed by the above noted references provides a simple and reliable means for providing a direct indication of the open flow area for a pair of interconnected vanes. Using the classification gauges disclosed above, such a value could be obtained, for example, by appropriately combining information from various indicators. However, such a step is undesireable since it introduces complexity and possibly error into measurement of the open flow area.

Accordingly, there has been found to remain a need for a relatively simple and accurate classification gauge for directly providing an indication of the open flow area between a pair of interconnected vanes. In this regard, such vanes are commonly interconnected with one of the vanes being in a relatively leading position and the other vane being in a trailing or following position. With such an arrangement, the open flow area or "throat area" is defined by the trailing edge of the leading vane, a convex portion of an airfoil surface of the following vane opposite the trailing edge of the leading vane and the inside surfaces of the opposite end buttresses. In other words, the length of the open flow area is determined by the average spacing between the end buttresses while the width of the open flow area is determined by the average spacing between the trailing edge of the leading vane and the opposite convex portion of the airfoil surface for the following vane. The value for the overall open flow area defined by the two vanes may thus be determined as the product of the average length between the buttresses times the average width between the vanes.

SUMMARY OF THE INVENTION

It is therefore an object of the invention to provide a method and apparatus for providing a direct indication of the open flow area between a pair of airfoils or vanes interconnected by means of end buttresses.

It is a more particular object of the invention to provide such a method and apparatus based on a classification gauge including datum means for accurately positioning the gauge on the vane assembly, separate sets of probes respectively contacting the trailing edge of the leading vane and the adjacent airfoil surface of the following vane, lateral probes contacting the inside surfaces of the respective buttresses at the opposite ends of the open flow area, an indicator means for providing a direct indication of open flow area being effectively interconnected with both sets of probes and both lateral probes by means of a proportional mechanism.

Preferably, one of the sets of probes is interconnected with a fixed portion of the gauge by an averaging linkage while the other set of probes is interconnected with a first movable element, one of the lateral probes also being fixed relative to the gauge with the other lateral probe being interconnected with a second movable element, the proportional means being arranged for interaction with both the first and second movable elements in order to permit a direct indication of open flow area from the indicator.

The datum means for accurately positioning a frame or jig of the classification gauge on the vane assembly preferably includes means linearly contacting one of the vanes such as the trailing edge of the leading vane, additional means contacting another portion of the vane assembly in order to limit rotation of the assembly about that linear base. The datum means may also be assumed to include one of the lateral probes in order to accurately fix the lateral position of the vane assembly within the classification gauge. With such a combination, the position of the classification gauge is accurately fixed within the vane assembly about three perpendicular axes. This is an important feature of the present invention since it is believed to particularly contribute to the simplicity of the present classification gauge and the accurate and repeatable results produced by the gauge.

It is also preferably contemplated in the method and apparatus of the present invention that resilient means be employed for uniformly urging the two steps of probes and the two lateral probes into uniform engagement with respective portions of the vane assembly in order to further assure more accurate and repeatable results from the present classification gauge. Even more preferably, such an arrangement is achieved by fixing one of the sets of probes relative to the frame of the classification gauge while employing a spring or other resilient means for urging the other set of probes into engagement with the respective portion of the vane assembly. Similarly, one of the lateral probes may be relatively fixed upon the frame of the classification gauge while a spring or other resilient means is employed for urging the other lateral probe into engagement with an opposite end buttress of the vane assembly. It will be noted in the following preferred embodiment that the classification gauge preferably includes means for retracting the resiliently movable set of probes and the resiliently movable lateral probe in order to insert the classification gauge into the vane assembly; the retracting means then being released in order to permit the springs to urge the movable set of probes and the movable lateral probe into engagement with the vane assembly. Moreover, it will be apparent that other arrangements are also contemplated by the present invention. For example, the movable set of probes and the movable lateral probe could have normal relaxed positions permitting insertion of the vane assembly into the classification gauge. With such an arrangement, force could then be applied to the movable set of probes and the movable lateral probe through the respective springs or other resilient means in order to urge those probes into engagement with appropriate proportions of the vane assembly.

With the classification gauge thus being accurately and repeatably positioned on the vane assembly, the gauge is designed to provide a direct indication of the composite open flow area or throat area for the vane assembly. Because of the simplicity of the present classification gauge and the stability with which the vane assembly is mounted therein, the method and apparatus of the present invention has been found to produce remarkably reproducible results even when the classification gauge is operated by different personnel for measuring the open flow area of a given vane assembly.

Additional objects and advantages of the invention are made apparent in the following description having reference to the accompanying drawings.

BRIEF DESCRIPTION OF THE DRAWINGS

FIG. 1 is a side view of the classification gauge of the present invention illustrating the arrangement of a vane assembly therein.

FIG. 2 is a view taken from the right end of FIG. 1 in order to better illustrate the various movable components of the classification gauge.

FIG. 4 is a view taken from the bottom of FIG. 1.

DESCRIPTION OF THE PREFERRED EMBODIMENT

A classification gauge for measuring the open flow area of a pair of airfoils or vanes is generally indicated at 10 in FIGS. 1, 2 and 4. The classification gauge 10 is described below with specific reference to a vane assembly 12 in order to better define interaction of the classification gauge with the vane assembly. The vane assembly 12, which is shown in FIG. 1 but may be best seen in FIG. 6 includes a pair of vanes 14 and 16 which are interconnected at their opposite ends by means of buttresses 18 and 20. It will be apparent that the vane assembly 12 may simply be a combination of two adjacent vanes 14 and 16 as illustrated or a portion of a larger vane cluster. In any event, the classification gauge 10 is adapted for measuring the open flow area or "throat area" between any two such adjacent vanes.

Figure 6:
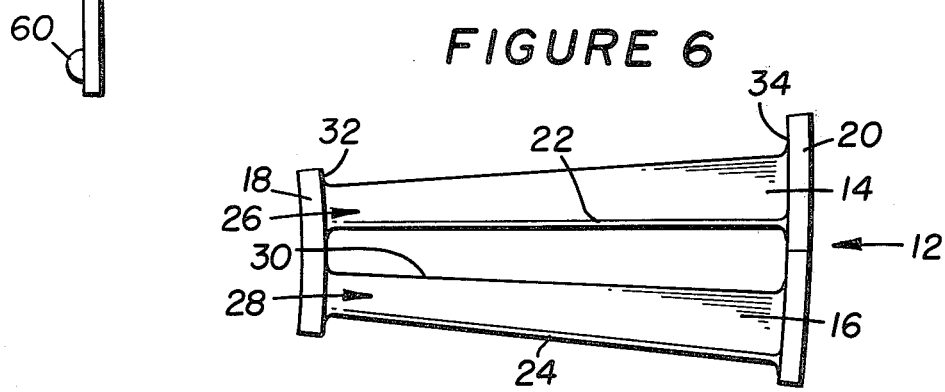
FIG. 6 is a view of a typical vane assembly including two vanes interconnected by opposite end buttresses to better illustrate the open flow area or "throat area" which is to be measured by the method and apparatus of the present invention.

In a conventional airfoil or vane arrangement, one of the vanes, such as that indicated at 14, is offset in a leading position with the other vane 16 being in a following position. Referring particularly to FIG. 6, a trailing edge 22 of the leading vane 14 is indicated at 22, the other vane 16 similarly having a trailing edge 24. Each of the vanes 14 and 16 is also formed with a convex airfoil surface 26 or 28 extending forwardly from the respective trailing edges 22 and 24. A portion 30 of the convex airfoil surface 28 for the following vane lies opposite the trailing edge 22 for the leading vane. The average spacing between the portion 30 and the trailing edge 22 define one dimension of the open flow area. For convenience, these two limits may be termed longitudinal sides of the open flow area, the average distance therebetween defining the width of the open flow area. The other dimension or length of the open flow area is determined by the average spacing between the inside surfaces 32 and 34 of the buttresses 18 and 20. It will therefore be apparent from FIGS. 1 and 6 taken together that the average distance between the inside buttress surfaces 32 and 34 may be multiplied by the average spacing between the leading edge 22 and the portion 30 of the convex airfoil surface 28 in order to determine the actual flow area formed between the two vanes 14 and 16. The manner in which the classification gauge 10 is constructed and operates to perform that measurement is described in detail below.

Referring now particularly to FIGS. 1, 2 and 4, the classification gauge 10 includes a fabricated frame 36 with an extension 38 formed on the front of the classification gauge. For convenience, the classification gauge 10 is shown in FIGS. 1 and 4 as having three perpendicular axes X, Y and Z. The Z axis extends from front to rear of the gauge, the X axis extends laterally across the gauge while the Y axis extends longitudinally or from top to bottom of the gauge. These three axes are also used below in order to describe orientation of the gauge when it is properly positioned within or upon the vane assembly 12.

Initially, the gauge 10 is positioned upon the vane assembly 12 by means of a plurality of fixed datum points formed relative to the classification gauge frame 36. In this regard, stop rails 40 and 42 are exposed at the rear of the classification gauge for engaging a linear portion of the vane assembly 12. Preferably, the stop rails 40 and 42 are arranged to engage the trailing edge 22 for the leading vane 14. Rotation of the vane assembly 12 about the linear reference formed by the stop rails 40 and 42 is limited by means of a hook 44 formed on the extension 38. As may be seen in FIG. 1, the hook 44 engages the trailing edge 24 of the following vane 16. The additional fixed datum point for the classification gauge is formed by a carbide tip or probe 46 arranged for engagement with the inside surface 32 of the buttress 18. Thus, it may be seen that when the appropriate surfaces of the vane assembly 12 are in engagement with the datum points 40, 42, 44 and 46, the position of the vane assembly is accurately determined relative to each of the X, Y and Z axes.

With the gauge 10 thus positioned upon the vane assembly 12, the classification gauge 10 also includes an additional datum means which is fixed relative to the frame 36 for providing a reference from which to measure the width of the open flow area. This final datum reference is formed by a plurality of hardened, carbide probes 48. Preferably, a plurality of eight such probes 48 are interconnected by means of an averaging linkage 50 with two pivot points 52 and 54 formed in fixed relation upon the frame 36. The probes 48 are arranged along the lower surface of the classification gauge in order to intimately contact the portion 30 of the convex airfoil surface 28 for the following vane 16 when the vane assembly 12 is in the position illustrated in FIG. 1. The use of the two pivot points 52 and 54 thus establishes a linear datum for the classification gauge relative to the convex airfoil surface portion 30. The averaging linkage 50 is generally similar to averaging linkages described in the references noted above. For example, referring particularly to FIG. 4, adjacent pairs of the probes 48 are formed by radiused contact blocks 56. Adjacent pairs of the contact blocks 56 are pivotably secured to respective links 58 which are in turn connected to the classification gauge frame 36 at the two pivot points 52 and 54. Referring particularly to FIG. 2, it may be seen that the pivot points 52 and 54 and accordingly the general alignment of the probes 48 is slightly offset from the horizontal X axis of the classification gauge in order to accommodate the trapezoidal configuration for the open flow area formed between the vanes 14 and 16.

With the gauge 10 being positioned in the manner described above within or upon the vane assembly 12, movable probes are then employed to determine the lateral and longitudinal dimensions of the open flow area in order to permit precise calculation of the open flow area by the classification gauge. These movable probes are described below.

Initially, a single carbide tip or probe 60 is mounted upon a lateral gate 62 which is pivotably interconnected to the classification gauge frame 36 as indicated at 64. Referring now particularly to FIGS. 2 and 4, the movable probe 60 is disposed opposite the fixed probe 46 in order to engage the inside surface 34 of the opposite buttress 20. At this point, it is noted that since the longitudinal length of the open flow area is much greater than its lateral width, only single point measurements are considered necessary for determining the average spacing between the inside buttress surfaces 32 and 34 (see FIG. 6).

Figure 3:
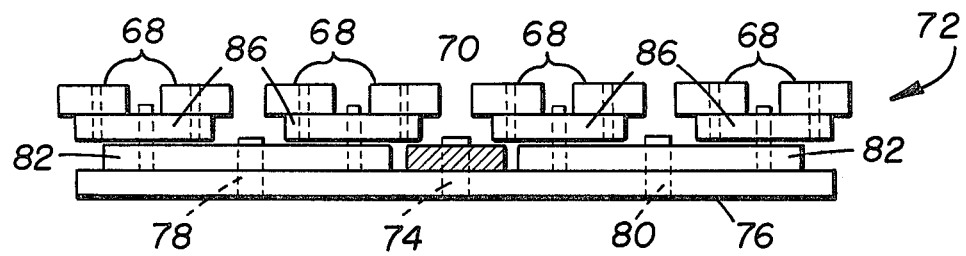
FIG. 3 is a fragmentary view taken along section line III—III of FIG. 2 to better illustrate a portion of the classification gauge.

A set of eight movable probes, also formed from hardened carbide, are indicated at 66 and are mounted upon respective fingers 68. The fingers 68 are in turn interconnected with an indicating link 70 by means of an averaging linkage 72 which may best be seen in the fragmentary representation of FIG. 3. Referring particularly to FIG. 3, the averaging linkage 72 is generally of similar construction as the averaging linkage 50 except that the averaging linkage 72 has only a single pivot 74 interconnected with the indicating link 70. The pivot 74 interconnects the indicating link 70 with a cross bar 76 (FIG. 2) which is interconnected toward its opposite ends with intermediate links, both indicated at 82, by means of pivot points 78 and 80. Each of the intermediate links 82 is in turn interconnected by respective pivot points 84 with two final links 86. Each of the four final links 86 is in turn pivotably interconnected with respective adjacent pairs of the fingers 68. Through this arrangement, the indicating link 70 is thus positioned in response to the average location for all of the eight probes 66. However, it should also be understood that unequal or weighted averaging can be accomplished with the movable probes 66 by varying the linkage.

Referring now particularly to FIG. 2, a proportional mechanism 88 is described for responding to the positions of the lateral gate 62 and the indicating link 70 in order to produce a reading in an indicating gauge 90 which corresponds to the open flow area determined as the product of its length taken by the average spacing between the trailing edge of the vane 14 and the convex airfoil surface on the following vane 16. The proportional mechanism 88 also includes means for retracting the movable probes 60 and 66 in a manner described in greater detail below in order to facilitate installing and removing the gauge 10 from the vane assembly 12. In addition, the proportional mechanism 88 is interconnected with the movable probes by resilient means also described in greater detail below in order to assure more uniform engagement pressure of the movable probes with the respective surface portions of the vane assembly.

Figure 5:
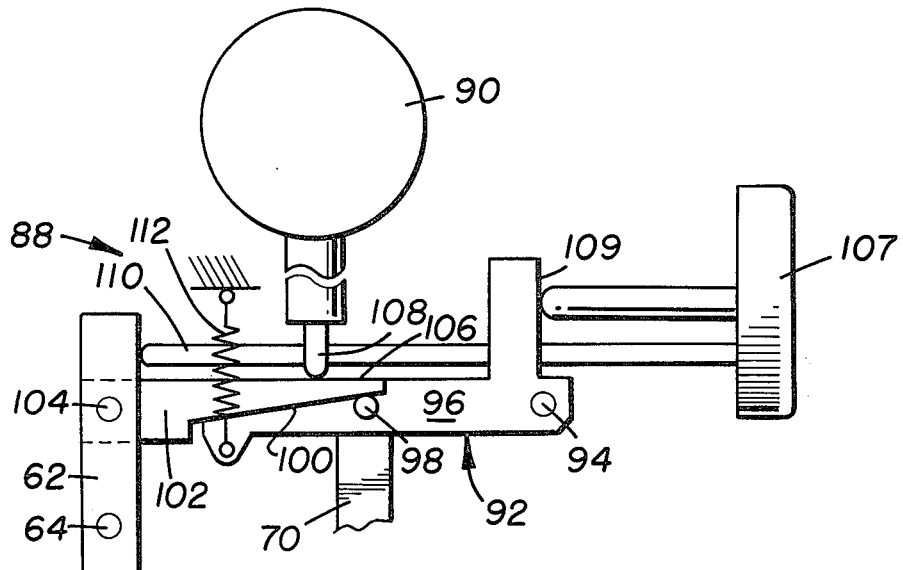
FIG. 5 is a fragmentary representation of a portion of the classification gauge including a proportional mechanism enabling the classification gauge to provide a direct indication of composite open flow area.

The proportional mechanism 88 includes a lever 92 which is pivoted to the classification gauge frame 36 at 94. A laterally extending arm 96 is pivotably interconnected at mid-length to the indicating link 70 by means of a pivot pin 98. The pin 98 extends outwardly from the lever arm 96 for engagement with a ramp surface 100 formed on a lateral indicating link 102. The lateral indicating link 102 is also pivotably interconnected at its opposite end, as indicated at 104, with the lateral gate 62 above its pivot connection 64 with the classification gauge frame. Thus, the indicating link 102 moves laterally in opposition to the tip or probe 60. An upper surface of the lateral indicating link 102, indicated at 106 opposite the ramp surface 100, engages a movable tip 108 for the indicator gauge 90 so that the indicator gauge 90 displays a reading proportional to vertical positioning of the surface 106 of the lateral indicating link 102. Having reference particularly to FIG. 5, it may be seen that the position of the surface 106 is determined both by lateral movement of the link 102 responsive to the position of the probe 60 and the vertical position of the pin 98 which, as noted above, corresponds to the average position for the eight probes 66. In this manner, the proportional mechanism 88 serves to produce a direct reading in the indicator gauge 90 precisely corresponding to the open flow area for the two vanes 14 and 16.

In order to facilitate installation and removal of the gauge 10 from the vane assembly 10, a retracting button 107 acts against a vertical arm 109 on the lever 92 and also acts against the upper end of the lateral gate 62 by means of a pin 110 extending across the classification gauge. At the same time, a spring 112 is interconnected between a portion of the classification gauge frame 36 and the laterally extending arm 96 of the lever 92. Thus, the spring 112 tends to rotate the lever 92 in a clockwise direction as viewed in FIG. 2. The probes 66 mounted upon the fingers 68 therefore tend to be drawn upwardly into engagement with the trailing edge 22 by means of the spring 112 while the probe 60 is also urged outwardly or leftwardly as viewed in FIG. 2 into engagement with the inside buttress surface 34. In this manner, constant tension of the spring 112 serves to produce uniform and reproducible engagement of the probes with the respective surfaces of the vane assembly.

The method of operation for employing the classification gauge 10 to measure the open flow area of a vane assembly is believed clearly apparent from the preceding description. However, the method of operation is briefly described below in order to assure complete disclosure thereof.

In order to mount the gauge 10 upon the vane assembly 12, the retracting button 107 is depressed to move the lateral probe 60 in a rightward direction as viewed in FIG. 2 while also retracting or lowering the probes 66 mounted upon the finger 68. With the classification gauge 10 in this configuration, the gauge may be readily positioned within the vane assembly 12. The trailing edge 22 is placed in engagement with the stop rails 40 and 42 while the other trailing edge 24 is placed in engagement with the hook 44. At the same time, the airfoil surface portion 30 is placed in engagement with the probes 48. The gauge may then be moved laterally in order to engage the lateral probe 46 with the inside buttress surface 32 (see FIG. 6).

With the gauge 10 thus properly positioned upon the vane assembly 12, the retracting button 107 is released, allowing the spring 112 to urge the movable lateral probe 60 into engagement with the inside buttress surface 34 while also urging the eight probes 66 into uniform, intimate engagement with the trailing edge 22. With those probes in engagement as described above, the proportional mechanism is thus positioned in order to produce a direct indication of the open throat area on the indicator 90. After the area reading for the vane assembly is determined, the button 107 may again be depressed in order to facilitate removal of the gauge 10 from the vane assembly 12. Thereafter, another similar vane assembly may have its open flow area measured in the same manner described above.

Accordingly, there has been described a classification gauge and a method of employing the gauge for producing a direct measurement of open throat area in a vane assembly including a pair of spaced apart vanes. Numerous variations and modifications of the invention will be apparent from the preceding description. Accordingly, the scope of the invention is defined only by the following appended claims.

What is claimed:

1. A classification gauge for measuring open flow area of a vane assembly including a leading vane, a following vane and opposite end buttresses, the open flow area being defined by a trailing edge of the leading vane, a convex portion of an airfoil surface of the following vane opposite the trailing edge of the leading vane and inside surfaces of the opposite end buttresses, comprising a frame, means arranged on the frame for accurate positioning of the frame on the vane assembly and for locating one lateral end and one longitudinal side of the open flow area, first probe means for engaging an opposite longitudinal side of the open flow area, second probe means for engaging an opposite lateral end of the open flow area, a proportional means arranged for interaction with both the first and second probe means, and indicator means responsive to the proportional means for providing an indication of open flow area.

2. The classification gauge of claim 1 wherein the positioning means includes means for positioning the vane assembly about three perpendicular axes.

3. The classification gauge of claim 2 wherein the positioning means includes means for engaging an edge of one vane, means for limiting rotation of the vane assembly about the edge and means for engaging one of the end buttresses.

4. The classification gauge of claim 1 further comprising resilient means arranged for interaction with the first and second probe means to insure their uniform engagement with respective portions of the vane assembly.

5. The classification gauge of claim 4 further comprising means for retracting the first and second probe means to facilitate insertion and removal of the classification gauge from the vane assembly and for selectively repositioning the first and second probe means for engagement with respective portions of the vane assembly.

6. The classification gauge of claim 1 wherein the first probe means comprises a set of probes interconnected with the proportional means by means of an averaging linkage.

7. The classification gauge of claim 1 wherein the positioning means includes a third probe means for engaging the one longitudinal side of the open flow area and a fourth probe means for engaging the one lateral end of the open flow area, said first, second, third and fourth probe means being relatively retractable on the classification gauge frame for movement into and out of the open flow area of the vane assembly and relatively extendible for engagement with respective portions of the open flow area.

8. The classification gauge of claim 7 further comprising resilient means arranged for effective interaction with the first, second, third and fourth probe means for producing uniform engagement thereof with the respective portions of the open flow area.

9. The classification gauge of claim 8 wherein said first and third probe means each include sets of multiple probes and further comprising a separate averaging linkage interconnected with each set of probes.

10. The classification gauge of claim 1 wherein the proportional means comprises a first indicating link interconnected with the said first probe means and a second indicating link interconnected with the second probe means, one of the indicating links being operatively coupled with the indicator means and including a ramp surface, the other indicating link being arranged for interaction with the ramp surface of the one indicating link.

11. A classification gauge for measuring open flow area of a vane assembly including a leading vane, a following vane and opposite end buttresses, the open flow area being defined by a trailing edge of the leading vane, a convex portion of an airfoil surface of the following vane opposite the trailing edge of the leading vane and the inside surfaces of the opposite end buttresses, comprising
 a frame,
 datum means for accurate positioning the frame on the vane assembly,
 first and second sets of probes for respectively contacting the trailing edge of the leading vane and the airfoil surface of the following vane, one of the sets of probes being interconnected with a fixed portion of the frame, the other set of probes being interconnected with a first indicating link,
 first and second lateral probes for engaging the inside surfaces of the respective buttresses at opposite ends of the open flow area, one of the lateral probes being fixed relative to the frame, the other being interconnected with a second indicating link,
 means for urging the first and second sets of probes into uniform engagement with the respective vanes and for urging the lateral probes into uniform engagement with the buttresses,
 proportional means arranged for interaction with both the first and second indicating links, and
 indicator means responsive to the proportional means for providing an indication of open flow area.

12. The classification gauge of claim 11 further comprising separate averaging linkages for interconnecting the first and second sets of probes respectively with the frame and with the first indicating link.

13. The classification gauge of claim 11 wherein the datum means includes means for accurately positioning the vane assembly about three perpendicular axes.

14. The classification gauge of claim 13 wherein the datum means includes multiple means for engaging the trailing edge of one vane, additional means for limiting rotation of the vane assembly about the one trailing edge and means for limiting lateral movement of the vane assembly.

15. The classification gauge of claim 11 further comprising resilient means arranged for effective interaction with the first and second sets of probes and the first and second lateral probes in order to assure uniform engagement of the probes with respective portions of the vane assembly.

16. The classification gauge of claim 15 further comprising means for effectively retracting the first and second sets of probes and the first and second lateral probes to facilitate installation and removal of the classification gauge from the vane assembly and effectively expanding the first and second sets of probes and the first and second lateral probes for assuring their uniform engagement with respective portions of the vane assembly.

17. The classification gauge of claim 16 wherein the datum means includes multiple means for engaging the trailing edge of one vane, additional means for limiting rotation of the vane assembly about the one trailing edge and means for limiting lateral movement of the vane assembly.

18. The classification gauge of claim 11 wherein the proportional means comprises a means operatively coupling one of the first and second indicating links with the indicator means, the other of the first and second indicating links being coupled in biasing relation with the one indicating link to permit proportional response of the indicator means to both the first and second indicating links.

19. In a method for accurately measuring the open flow area of a vane assembly including a leading vane, a following vane and opposite end buttresses, the open flow area being defined by a trailing edge of the leading vane, a convex portion of an airfoil surface of the following vane opposite the trailing edge of the leading vane and the inside surfaces of the opposite end buttresses, the steps comprising
 accurately positioning a classification gauge in the vane assembly, the vane assembly being positioned relative to three perpendicular axes,
 urging first and second sets of probes of the classification gauge into engagement with the trailing edge of the leading vane and the airfoil surface of the following vane,
 urging first and second lateral probes of the classification gauge into engagement with the inside surfaces of the respective buttresses, and
 effectively interconnecting the first and second sets of probes and the first and second lateral probes with an indicator means through proportional means arranged for effective interaction with both the first and second sets of probes and the first and second lateral probes in order to directly produce an indication of open flow area in the indicator means.

20. The method of claim 19 further comprising the step of applying resilient force to the first and second sets of probes and the first and second lateral probes in order to assure their uniform engagement with respective portions of the vane assembly.

21. The method of claim 19 further comprising the step of relatively retracting the first and second sets of probes and the first and second lateral probes to facilitate installation and removal of the classification gauge from the vane assembly and relatively expanding the first and second sets of probes and the first and second lateral probes for uniform engagement with the respective portions of the vane assembly.

22. In a method for accurately measuring open flow area of a vane assembly including a leading vane, a following vane and opposite end buttresses, the open flow area being defined by a trailing edge of the leading vane, a convex portion of an airfoil surface of the following vane opposite the trailing edge of the leading vane and the inside surfaces of the opposite end buttresses, the steps comprising
 accurately positioning the vane assembly relative to three perpendicular axes within a classification gauge for locating one lateral end and one longitudinal side of the open flow area of the vane assembly, urging a first probe means of the classification gauge into engagement with an opposite longitudinal side of the open flow area of the vane assembly, urging a second probe means of the classification gauge into engagement with an opposite lateral end of the open flow area for the vane assembly, and interconnecting both the first and second probe means with an indicator means through a proportional mechanism arranged for interaction with both the first and second probe means in order to directly produce an indication of open flow area on the indicator means.

* * * * *